US012739739B2

(12) United States Patent
Panigrahi et al.

(10) Patent No.: US 12,739,739 B2
(45) Date of Patent: Sep. 15, 2026

(54) METHOD AND APPARATUS TO ACCESS CORE NETWORKS VIA GATEWAY FUNCTIONS

(71) Applicant: Nokia Technologies Oy, Espoo (FI)

(72) Inventors: Bighnaraj Panigrahi, Bangalore (IN); Saurabh Khare, Bangalore (IN); Georgios Gkellas, Athens (GR); Laurent Thiebaut, Massy (FR)

(73) Assignee: Nokia Technologies Oy, Espoo (FI)

( * ) Notice: Subject to any disclaimer, the term of this patent is extended or adjusted under 35 U.S.C. 154(b) by 347 days.

(21) Appl. No.: 18/447,559

(22) Filed: Aug. 10, 2023

(65) Prior Publication Data

US 2024/0205813 A1 Jun. 20, 2024

(30) Foreign Application Priority Data

Aug. 10, 2022 (IN) ............................ 202211045684

(51) Int. Cl.
*H04W 48/18* (2009.01)
*H04W 12/06* (2021.01)
(Continued)

(52) U.S. Cl.
CPC ........... *H04W 48/18* (2013.01); *H04W 12/06* (2013.01); *H04W 48/02* (2013.01); *H04W 60/04* (2013.01)

(58) Field of Classification Search
CPC ..... H04W 48/18; H04W 12/06; H04W 48/02; H04W 60/04; H04W 48/08; H04W 92/02
See application file for complete search history.

(56) References Cited

U.S. PATENT DOCUMENTS

2019/0029065 A1* 1/2019 Park ...................... H04W 60/00
2019/0075512 A1* 3/2019 Jin ........................ H04W 48/08
(Continued)

FOREIGN PATENT DOCUMENTS

CN 113498086 A 10/2021
EP 3544337 A1 9/2019
(Continued)

OTHER PUBLICATIONS

Solution on selecting N3IWF supporting the S-NSSAI needed by UE, s3GPP TSG-WG SA2 Meeting #150 e-meeting, S2-2203509, Agenda:9313 Huawei, Apr. 6-12, 2022, pp. 3-4 (Year: 2022).*
(Continued)

*Primary Examiner* — Brandon J Miller
(74) *Attorney, Agent, or Firm* — Nokia Technologies Oy

(57) ABSTRACT

Techniques for accessing a core network via access points and gateway functions are provided. For example, a method comprises: determining one or more candidate gateway functions for accessing the core network via the access point; transmitting, to the one or more candidate gateway functions or to a core network function, a request for use of the one or more gateway functions to access the core network; and receiving, from the gateway function or from the core network function, a request response per candidate gateway function, the request response being configured to indicate whether the access to the core network via the respective gateway function is rejected and, in the case of rejection, to indicate a cause of rejection. The method may be performed by the terminal device (e.g., a user equipment, UE). Corresponding methods that can be performed by a network device are also provided.

7 Claims, 9 Drawing Sheets

(51) Int. Cl.
*H04W 48/02* (2009.01)
*H04W 60/04* (2009.01)

(56) References Cited

U.S. PATENT DOCUMENTS

| | | | | |
|---|---|---|---|---|
| 2019/0215691 | A1* | 7/2019 | Salkintzis | H04W 12/069 |
| 2019/0357129 | A1* | 11/2019 | Park | H04W 60/04 |
| 2021/0136582 | A1* | 5/2021 | Liu | H04W 8/08 |
| 2021/0344680 | A1* | 11/2021 | Guo | H04L 63/10 |
| 2023/0239779 | A1* | 7/2023 | Speicher | H04W 48/18 370/329 |

FOREIGN PATENT DOCUMENTS

| | | | | |
|---|---|---|---|---|
| JP | 2019-534653 | A | 11/2019 | |
| JP | 2020-524940 | A | 8/2020 | |
| WO | 2021/153150 | A1 | 8/2021 | |
| WO | 2021197630 | A1 | 10/2021 | |
| WO | 2021227599 | A1 | 11/2021 | |
| WO | WO-2022228673 | A1 * | 11/2022 | H04W 48/18 |
| WO | 2023185880 | A1 | 10/2023 | |

OTHER PUBLICATIONS

Solutions on selecting N3IWF supporting the S-NSSAI needed by UE, s3GPP TSG-WG SA2 Meeting #150 e-meeting, S2-2203509, Agenda:9913 Huawei, Apr. 6-12, 2022, pp. 3-4 (Year: 2002) (Year: 2002).*

Search Report received for corresponding United Kingdom Patent Application No. 2312105.6, dated Feb. 5, 2024, 4 pages.

"Support of different slices over different Non 3GPP access", SA WG2 Meeting #143e, S2-2100067, Nokia, Feb. 24-Mar. 9, 2021, 8 pages.

Office Action received for corresponding United Kingdom Patent Application No. 2312105.6, dated Mar. 31, 2025, 5 pages.

"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.

"3rd Generation Partnership Project; Technical Specification Group Services and System Aspects; Procedures for the 5G System (5GS); Stage 2 (Release 17)", 3GPP TS 23.502, V17.5.0, Jun. 2022, pp. 1-744.

"3rd Generation Partnership Project; Technical Specification Group Services and System Aspects; Study on the support for 5WWC, Phase 2 (Release 18)", 3GPP TR 23.700-17, V0.2.0, Apr. 2022, pp. 1-69.

"Update to solution 13", SA WG2 Meeting #152e, S2-220xxxx, Agenda: 9.13, Nokia, Aug. 17-26, 2022, pp. 1-5.

"IEEE 802.11", Wikipedia, Retrieved on Aug. 1, 2023, Webpage available at : https://en.wikipedia.org/wiki/IEEE_802.11.

"IEEE 802.16", Wikipedia, Retrieved on Aug. 1, 2023, Webpage available at : https://en.wikipedia.org/wiki/IEEE_802.16.

"IEEE 802.3", Wikipedia, Retrieved on Aug. 1, 2023, Webpage available at : https://en.wikipedia.org/wiki/IEEE_802.3.

"IEEE 802.15", Wikipedia, Retrieved on Aug. 1, 2023, Webpage available at : https://en.wikipedia.org/wiki/IEEE_802.15.

"3rd Generation Partnership Project; Technical Specification Group Core Network and Terminals; Domain Name System Procedures; Stage 3; (Release 17)", 3GPP TS 29.303, V17.3.0, Mar. 2022, pp. 1-83.

Extended European Search Report received for corresponding European Patent Application No. 23190288.3, Nov. 9, 2023, 9 pages.

"Solution on selecting N3IWF supporting the S-NSSAI needed by UE", s3GPP Tsg-Wg SA2 Meeting #150E e-meeting, S2-2203509, Agenda: 9.13, Huawei, Apr. 6-12, 2022 , 5 pages.

International Search Report and Written Opinion received for corresponding Patent Cooperation Treaty Application No. PCT/IB2023/058103, dated Nov. 9, 2023, 14 pages.

Office action received for corresponding European Patent Application No. 23190288.3, dated Sep. 26, 2025, 4 pages.

Office action received for corresponding European Patent Application No. 23190288.3, dated Mar. 12, 2026, 4 pages.

* cited by examiner

METHOD AND APPARATUS TO ACCESS CORE NETWORKS VIA GATEWAY FUNCTIONS

RELATED APPLICATIONS

This application claims the benefit of priority of Indian Provisional Patent Application No. 202211045684 filed Aug. 10, 2022, the contents of which are hereby incorporated by reference as if reproduced in their entirety.

FIELD

The subject disclosure generally relates to wireless communication systems and more particularly, to accessing core networks of wireless communication systems. Yet more particularly, the subject disclosure provides methods and apparatuses for accessing core networks via access points and gateway functions.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

Developing networks enable new services to customers. One service is network slicing, which enables offering connectivity, quality of service and data processing solutions tailored to specific customers' requirements. A network slice is a logical end-to-end virtual network that can be dynamically created and that provides specific capabilities and characteristics. Multiple network slices may be created on top of a common shared physical network infrastructure to run services that may have different requirements on latency, reliability, throughput and mobility.

Furthermore, a variety of options are developed for accessing telecommunication systems via different access points which differ inter alia in their support of different slices. Depending on the slices required by a terminal device, a suitable access gateway shall be selected. The use of access gateways requires determining whether a particular access gateway fulfills the terminal device's slicing requirements.

Hence, there is a need for exchanging information about slicing requirements for a variety of access gateways.

SUMMARY

According to a first aspect of the subject disclosure, a method of operating a terminal device in a communications network is provided. The communications network comprises a core network and an access point. The method comprises determining one or more candidate gateway functions for accessing the core network via the access point. The method further comprises transmitting, to the one or more candidate gateway functions or to a core network function, a request for use of the one or more gateway functions to access the core network. The method further comprises receiving, from the gateway function or from the core network function, a request response per candidate gateway function, the request response being configured to indicate whether the access to the core network via the respective gateway function is rejected and, in the case of rejection, to indicate a cause of rejection.

In some embodiments, the cause of rejection comprises non-support of one or more slices by the gateway function.

In some embodiments, the core network is a 3GPP core network, the access point is a Non-3GPP access point, and the gateway function is for at least one of Trusted Non-3GPP access and Non-Trusted Non-3GPP access.

In some embodiments, the gateway function comprises at least one of a Non-3GPP Interworking Function (N3IWF) and a Trusted Non-3GPP Gateway Function (TNGF).

In some embodiments, the method further comprises determining a set of one or more slices for use by the terminal device, wherein the request is configured to indicate the set of one or more slices.

In some embodiments, each of the one or more slices is identified by a corresponding Single Network Slice Selection Assistance Information (S-NSSAI).

In some embodiments, the request response is configured to indicate a subset of slices of the determined set, wherein access via the respective gateway function is rejected (or allowed) for the indicated subset.

In some embodiments, multiple candidate gateway functions are determined, and the transmitting of the request to a second one of the candidate gateway functions is performed prior to receiving a request response from a first one of the candidate gateway functions.

In some embodiments, multiple candidate gateway functions are determined, and wherein the transmitting of the request to a second one of the candidate gateway functions is performed subsequent to receiving a request response from a first one of the candidate gateway functions.

In some embodiments, the request comprises a registration or authentication request and/or the request response comprises a registration or authentication response.

In such cases, the method may further comprise selecting one candidate gateway function from the determined one or more gateway functions; and transmitting the registration or authentication request to the core network function via the selected gateway function.

In some embodiments, the core network function comprises an Access and Mobility Management Function (AMF).

According to a second aspect of the subject disclosure, a method of operating a network device in a communications network is provided. The communications network comprises a core network and an access point. The method comprises receiving a request for use of a gateway function by a terminal device in accessing the core network via the access point. The method further comprises transmitting a request response configured to indicate whether access by the terminal device to the core network via the gateway function is rejected and, in the case of rejection, to indicate a cause of rejection.

In some embodiments, the cause of rejection comprises non-support of one or more slices by the gateway function.

In some embodiments, the core network is a 3GPP core network, the access point is a Non-3GPP access point, and the gateway function is for at least one of Trusted Non-3GPP access and Non-Trusted Non-3GPP access.

In some embodiments, the gateway function comprises at least one of a Non-3GPP Interworking Function (N3IWF) and a Trusted Non-3GPP Gateway Function (TNGF).

In some embodiments, the request is configured to indicate a set of one or more slices for use by the terminal device.

In some embodiments, each of the one or more slices is identified by a corresponding Single Network Slice Selection Assistance Information (S-NSSAI).

In some embodiments, the method further comprises determining a subset of slices of the indicated set, and the request response is configured to indicate the determined subset, wherein access via the gateway function is rejected (or allowed) for the indicated subset.

In some embodiments, the network device comprises the core network function, wherein the network device receives the request via the gateway function. The determining the subset may comprise obtaining, for the requested gateway function, gateway slicing information; retrieving, from the received request, terminal slicing information based on the indicated set of one or more slices; and determining a subset of allowed slices based on an overlap between the gateway slicing information and the terminal slicing information.

In some embodiments, the method further comprises identifying, responsive to determining that the overlap is a true subset of the indicated set, an alternative gateway function based on the terminal slicing information. In such cases, the request response may be configured to indicate the alternative gateway function.

In some embodiments, the network device comprises the gateway function.

In some embodiments, the method further comprises sending an authentication request for authentication of the terminal device to an Access and Mobility Management Function (AMF); receiving, from the AMF, an authentication response indicating the cause of rejection; and including the cause of rejection in the request response to the terminal device.

In some embodiments, the network device comprises the core network function.

In some embodiments, the request comprises a registration or authentication request and/or the request response comprises a registration or authentication response.

In some embodiments, the core network function comprises an Access and Mobility Management Function (AMF).

According to a third aspect of the subject disclosure, a terminal device is provided for use in a communications network comprising a core network and an access point. The terminal device comprises at least one processor; and at least one memory including computer program code. The computer program code causes the terminal device, when executed with the at least one process that, to at least carry out the steps of a method according to the first aspect.

In particular, it causes the terminal device to determine one or more candidate gateway functions for accessing the core network via the access point; transmit, to the one or more candidate gateway functions or to a core network function, a request for use of the one or more gateway functions to access the core network; and receive, from the gateway function or from the core network function, a request response per candidate gateway function, the request response being configured to indicate whether the access to the core network via the respective gateway function is rejected and, in the case of rejection, to indicate a cause of rejection.

In some embodiments, the cause of rejection comprises non-support of one or more slices by the gateway function.

In some embodiments, the core network is a 3GPP core network, the access point is a Non-3GPP access point, and the gateway function is for at least one of Trusted Non-3GPP access and Non-Trusted Non-3GPP access.

In some embodiments, the gateway function comprises at least one of a Non-3GPP Interworking Function (N3IWF) and a Trusted Non-3GPP Gateway Function (TNGF).

In some embodiments, the computer program code causes the terminal device further to determine a set of one or more slices for use by the terminal device, wherein the request is configured to indicate the set of one or more slices.

In some embodiments, each of the one or more slices is identified by a corresponding Single Network Slice Selection Assistance Information (S-NSSAI).

In some embodiments, the request response is configured to indicate a subset of slices of the determined set, wherein access via the respective gateway function is rejected (or allowed) for the indicated subset.

In some embodiments, multiple candidate gateway functions are determined, and wherein the transmitting of the request to a second one of the candidate gateway functions is performed prior to or subsequent to receiving a request response from a first one of the candidate gateway functions.

In some embodiments, the request comprises a registration or authentication request and/or the request response comprises a registration or authentication response.

In some embodiments, the computer program code causes the terminal device further to select one candidate gateway function from the determined one or more gateway functions; and transmit the registration or authentication request to the core network function via the selected gateway function.

In some embodiments, the core network function comprises an Access and Mobility Management Function (AMF).

According to a fourth aspect of the subject disclosure, a network device is provided for use in a communications network comprising a core network and an access point. The network device comprises at least one processor; and at least one memory including computer program code. The computer program code causes the network device, when executed with the at least one processor, to at least carry out the steps of a method according to the second aspect.

In particular, it causes the network device to receive a request for use of a gateway function by a terminal device in accessing the core network via the access point; and transmit, to the terminal device, a request response configured to indicate whether access by the terminal device to the core network via the gateway function is rejected and, in the case of rejection, to indicate a cause of rejection.

In some embodiments, the cause of rejection comprises non-support of one or more slices by the gateway function.

In some embodiments, the core network is a 3GPP core network, the access point is a Non-3GPP access point, and the gateway function is for at least one of Trusted Non-3GPP access and Non-Trusted Non-3GPP access.

In some embodiments, the gateway function comprises at least one of a Non-3GPP Interworking Function (N3IWF) and a Trusted Non-3GPP Gateway Function (TNGF).

In some embodiments, the request is configured to indicate a set of one or more slices for use by the terminal device.

In some embodiments, each of the one or more slices is identified by a corresponding Single Network Slice Selection Assistance Information (S-NSSAI).

In some embodiments, the computer program code causes the network device further to determine a subset of slices of the indicated set, wherein the request response is configured to indicate the determined subset, wherein access via the gateway function is rejected (or allowed) for the indicated subset.

In some embodiments, the network device comprises the core network function, wherein the network device receives the request via the gateway function. The determining the subset comprise obtaining, for the requested gateway function, gateway slicing information; retrieving, from the received request, terminal slicing information based on the indicated set of one or more slices; and determining the subset of slices based on an overlap between the gateway slicing information and the terminal slicing information.

In some embodiments, the computer program code causes the network device further to identify, responsive to determining that the overlap is a true subset of the indicated set, an alternative gateway function based on the terminal slicing information, wherein the request response is configured to indicate the alternative gateway function.

In some embodiments, the network device comprises the gateway function.

In some embodiments, the computer program code causes the network device further to send an authentication request for authentication of the terminal device to an Access and Mobility Management Function (AMF), receive, from the AMF, an authentication response indicating the cause of rejection, and include the cause of rejection in the request response to the terminal device.

In some embodiments, the network device comprises the core network function.

In some embodiments, the request comprises a registration or authentication request and/or the request response comprises a registration or authentication response.

In some embodiments, the core network function comprises an Access and Mobility Management Function (AMF).

In a firth aspect, non-transitory computer-readable media are provide, containing computer-executable instructions which when run on one or more processors perform the steps of the method according to the first or second aspect.

The above-noted aspects and features may be implemented in systems, apparatuses, methods, articles and/or non-transitory computer-readable media depending on the desired configuration. The subject disclosure may be implemented in and/or used with a number of different types of devices, including but not limited to cellular phones, tablet computers, wearable computing devices, portable media players, and any of various other computing devices.

This summary is intended to provide a brief overview of some of the aspects and features according to the subject disclosure. Accordingly, it will be appreciated that the above-described features are merely examples and should not be construed to narrow the scope of the subject disclosure in any way. Other features, aspects, and advantages of the subject disclosure will become apparent from the following detailed description, drawings and claims.

LIST OF ABBREVIATIONS

In the subject disclosure, the following abbreviations are used and should be understood in accordance with the given definitions:

3GPP 3$^{rd}$ Generation Partnership Project
5G 5$^{th}$ Generation (Mobile Communication Network)
5GC 5G Core
5GS 5G System
AF Application Function
AMF Access and Mobility Management Function
AN Access Network
APN Access Point Name
AUSF Authentication Server Function
BS Base Station
CDMA Code Division Multiple Access
CN Core Network
CP Control Plane
eNB Evolved NodeB
EAP Extensible Authentication Protocol
EPC Evolved Packet Core
ePCO Extended PCO
EPS Evolved Packet System
ETSI European Telecommunications Standards Institute
E-UTRAN Evolved UMTS Terrestrial Radio Access
FQDN Full Qualified Domain Name
IE Information Element
IKE Internet Key Exchange
IP Internet Protocol
IPSec IP Security
LTE Long Term Evolution
MME Mobility Management Entity
N3IWF Non-3GPP Interworking Function
NAS Non-Access Stratum
NR New Radio
NSSAI Network Slice Selection Assistance Information
NSSF Network Slice Selection Function
PCF Policy Control Function
PCO Protocol Configuration Options
PDN Packet Data Network
PDP Packet Data Protocol
PGW PDN Gateway
PGW-C PGW Control Function
PLMN Public Land Mobile Network
RAN Radio Access Network
RCS Rich Communication Services
RRC Radio Resource Control (Protocol)
RSD Route Selection Descriptor
SGW Serving Gateway
SIM Subscriber Identity Module
SMF Session Management Function
S-NSSAI Single NSSAI
TNGF Trusted Non-3GPP Gateway Function
TS Technical Specification
UDM Unified Data Management
UE User Equipment
UPF User Plane Function
URLLC Ultra-Reliable Low Latency Communication
URSP UE Route Selection Policy
VONR Voice over NR

BRIEF DESCRIPTION OF THE DRAWINGS

A better understanding of the subject disclosure can be obtained when the following detailed description of various embodiments is considered in conjunction with the following drawings, in which.

DETAILED DESCRIPTION

Before explaining the examples in detail, certain general principles of a wireless communication system and mobile communication devices are briefly explained with reference to FIGS. 1 to 3 to assist in understanding the technology underlying the described examples.

Figure 1:
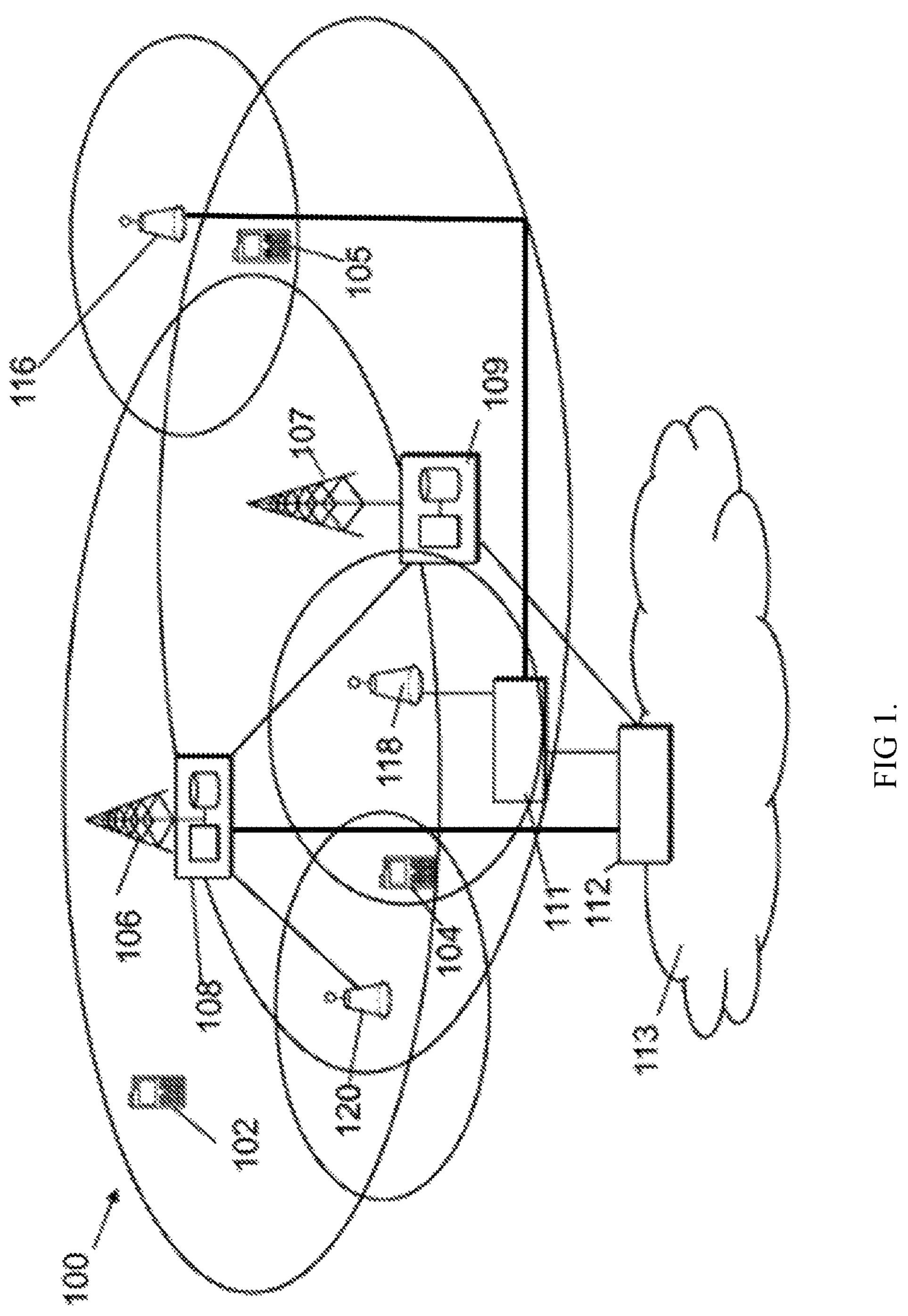
FIG. 1 shows a schematic diagram of an example communication system comprising a base station and a plurality of communication devices.

In a wireless communication system 100, such as that shown in FIG. 1, mobile communication devices or terminal devices (e.g., user equipment UE) 102, 104, 105 are provided wireless access via at least one base station (e.g., next generation NB, gNB) or similar wireless transmitting and/or receiving node, such as an access point. Base stations may be controlled or assisted by at least one appropriate controller apparatus, so as to enable operation thereof and management of mobile communication devices in communication with the base stations. The controller apparatus may be located in a radio access network (e.g., wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1, base stations 106 and 107 are shown as connected to a wider communications network 113 via gateway 112. A further gateway function may be provided to connect to another network.

As used herein, the term "base station" has the full breadth of its ordinary meaning, and at least includes a wireless communication station installed at a fixed location and used to communicate as part of a wireless telephone system or radio system. The communication area (or coverage area) of the base stations may be referred to as a "cell." The base stations and the UEs may be configured to communicate over the transmission medium using any of various radio access technologies (RATs), also referred to as wireless communication technologies, or telecommunication standards described hereinbelow. As illustrated in FIG. 1, while one of the base stations may act as a "serving cell" for UEs, each UE may also be capable of receiving signals from (and possibly within communication range of) one or more other cells (which might be provided by the base stations and/or any other base stations), which may be referred to as "neighboring cells".

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs. The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE Advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function or Access and Mobility Management Function).

Figure 2:
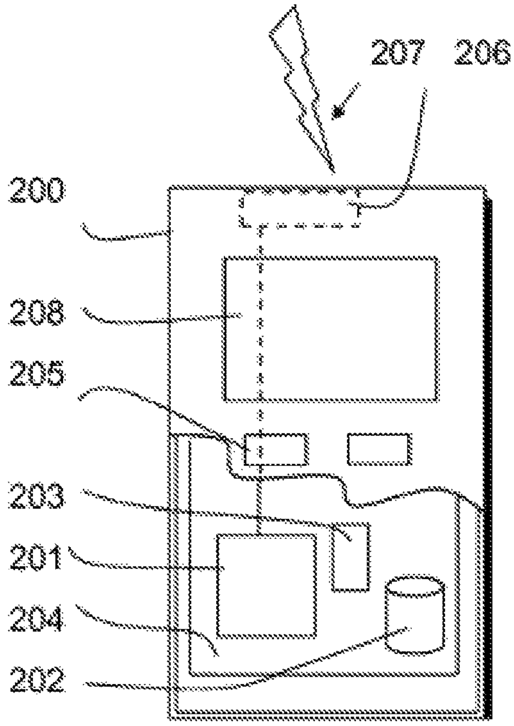
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal device. An appropriate mobile communication device may be provided by any device capable of sending and receiving radio signals. Non-limiting examples comprise a mobile station (MS) or mobile device such as a mobile phone or what is known as a smart phone, a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (e-mail), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g., a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as keypad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example handsfree equipment, thereto.

The communication device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

The communication device 200 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Generally, the communication device 200 illustrated in FIG. 2 includes a set of components configured to perform core functions. For example, this set of components may be implemented as a system on chip (SOC), which may include portions for various purposes. Alternatively, this set of components may be implemented as separate components or groups of components for the various purposes. The set of components may be coupled (e.g., communicatively; directly or indirectly) to various other circuits of the communication device 200.

The communication device 200 may include at least one antenna in communication with a transmitter and a receiver (e.g., the transceiver apparatus 206). Alternatively, transmit and receive antennas may be separate. The communication device 200 may also include a processor (e.g., the at least one data processing entity 201) configured to provide signals to and receive signals from the transmitter and receiver, respectively, and to control the functioning of the communication device 200. The processor may be configured to control the functioning of the transmitter and receiver by effecting control signaling via electrical leads to the transmitter and receiver. Likewise, the processor may be configured to control other elements of the communication device 200 by effecting control signaling via electrical leads connecting processor to the other elements, such as a display (e.g., display 208) or a memory (e.g., the at least one memory 202). The processor may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, in some examples, the processor may comprise a plurality of processors or processing cores.

The communication device 200 may be capable of operating with one or more air interface standards, communication protocols, modulation types, access types, and/or the like. Signals sent and received by the processor may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3. ADSL, DOCSIS, and/or the like. In addition, these signals may include speech data, user generated data, user requested data, and/or the like.

For example, the communication device 200 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like). For example, the communication device 200 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the communication device 200 may be capable of operating in accordance with 2.5G wireless communication protocols General Packet Radio Service (GPRS), Enhanced Data GSM Environment (EDGE), and/or the like. Further, for example, the communication device 200 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The communication device 200 may be additionally capable of operating in accordance with 3.9G wireless communication protocols, such as Long-Term Evolution (LTE), Evolved Universal Terrestrial Radio Access Network (E-UTRAN), and/or the like. Additionally, for example, the communication device 200 may be capable of operating in accordance with 4G wireless communication protocols, such as LTE Advanced, 5G, and/or the like as well as similar wireless communication protocols that may be subsequently developed.

It is understood that the processor may include circuitry for implementing audio/video and logic functions of the communication device 200. For example, the processor may comprise a digital signal processor device, a microprocessor device, an analog-to-digital converter, a digital-to-analog converter, and/or the like. Control and signal processing functions of the communication device 200 may be allocated between these devices according to their respective capabilities. The processor may additionally comprise an internal voice coder (VC), an internal data modem (DM), and/or the like. Further, the processor may include functionality to operate one or more software programs, which may be stored in memory. In general, the processor and stored software instructions may be configured to cause the communication device 200 to perform actions. For example, the processor may be capable of operating a connectivity program, such as a web browser. The connectivity program may allow the communication device 200 to transmit and receive web content, such as location-based content, according to a protocol, such as wireless application protocol (WAP), hypertext transfer protocol (HTTP), and/or the like.

The communication device 200 may also comprise a user interface including, for example, an earphone or speaker, a ringer, a microphone, a display, a user input interface, and/or the like, which may be operationally coupled to the processor. The display may, as noted above, include a touch sensitive display, where a user may touch and/or gesture to make selections, enter values, and/or the like. The processor may also include user interface circuitry configured to control at least some functions of one or more elements of the user interface, such as the speaker, the ringer, the microphone, the display, and/or the like. The processor and/or user interface circuitry comprising the processor may be configured to control one or more functions of one or more elements of the user interface through computer program instructions, for example, software and/or firmware, stored on a memory accessible to the processor, for example, volatile memory, non-volatile memory, and/or the like. The communication device 200 may include a battery for powering various circuits related to the mobile terminal, for example, a circuit to provide mechanical vibration as a detectable output. The user input interface may comprise devices allowing the communication device 200 to receive data, such as a keypad (e.g., keypad 206) and/or other input devices. The keypad can also be a virtual keyboard presented on display or an externally coupled keyboard.

The communication device 200 may also include one or more mechanisms for sharing and/or obtaining data. For example, the communication device 200 may include a short-range radio frequency (RF) transceiver and/or interrogator, so data may be shared with and/or obtained from electronic devices in accordance with RF techniques. The communication device 200 may include other short-range transceivers, such as an infrared (IR) transceiver, a Bluetooth™ (BT) transceiver operating using Bluetooth™ wireless technology, a wireless universal serial bus (USB) transceiver, a Bluetooth™ Low Energy transceiver, a ZigBee transceiver, an ANT transceiver, a cellular device-to-device transceiver, a wireless local area link transceiver, and/or any other short-range radio technology. The communication device 200 and, in particular, the short-range transceiver may be capable of transmitting data to and/or receiving data from electronic devices within the proximity of the apparatus, such as within 10 meters, for example. The communication device 200 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The communication device 200 may comprise memory, such as one or more Subscriber Identity Modules (SIM), one or more Universal Subscriber Identity Modules (USIM), one or more removable User Identity Modules (R-UIM), one or more eUICC, one or more UICC, and/or the like, which may store information elements related to a mobile subscriber. In addition, the communication device 200 may include other removable and/or fixed memory. The communication device 200 may include volatile memory and/or non-volatile memory. For example, the volatile memory may include Random Access Memory (RAM) including dynamic and/or static RAM, on-chip or off-chip cache memory, and/or the like. The non-volatile memory, which may be embedded and/or removable, may include, for example, read-only memory, flash memory, magnetic storage devices, for example, hard disks, floppy disk drives, magnetic tape, optical disc drives and/or media, non-volatile random-access memory (NVRAM), and/or the like. Like volatile memory, the non-volatile memory may include a cache area for temporary storage of data. At least part of the volatile and/or non-volatile memory may be embedded in the processor. The memories may store one or more software programs, instructions, pieces of information, data, and/or the like which may be used by the apparatus for performing operations disclosed herein.

The memories may comprise an identifier, such as an International Mobile Equipment Identification (IMEI) code, capable of uniquely identifying the communication device 200. The memories may comprise an identifier, such as an international mobile equipment identification (IMEI) code, capable of uniquely identifying the communication device 200. In the example embodiment, the processor may be configured using computer code stored at memory to cause the processor to perform operations disclosed herein.

Some of the embodiments disclosed herein may be implemented in software, hardware, application logic, or a combination of software, hardware, and application logic. The software, application logic, and/or hardware may reside on the memory, the processor, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 2, computer-readable medium may comprise a non-transitory computer-readable storage medium that may be any media that can contain or store the instructions for use by or in connection with an instruction execution system, apparatus, or device, such as a computer.

In some embodiments, the communication device 200 (i.e., a user equipment (UE) in a network) comprises the processor (e.g., the at least one data processing entity 201) and the memory (e.g., the at least one memory 202). The memory includes computer program code causing the communication device 200 to perform processing according to the methods described below with reference to FIG. 7.

Figure 3:
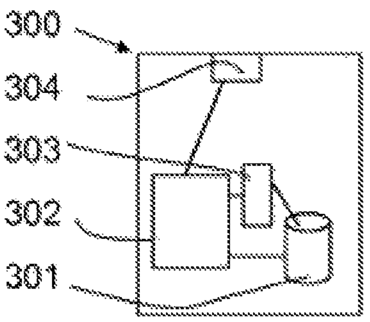
FIG. 3 shows a schematic diagram of an example control apparatus.

FIG. 3 shows an example embodiment of a control apparatus for a communication system, for example to be coupled to and/or for controlling a core network function such as AMF/SMF. Further examples of control apparatus may be coupled to and/or for controlling a station of an access system, such as a RAN node, e.g., a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Generally, the control apparatus 300 has an antenna, which transmits and receives radio signals. A radio frequency (RF) transceiver module, coupled with the antenna, receives RF signals from antenna, converts them to baseband signals and sends them to processor (e.g., the at least one data processing unit 302, 303). RF transceiver also converts received baseband signals from processor, converts them to RF signals, and sends out to antenna. Processor processes the received baseband signals and invokes different functional modules to perform features in control apparatus 300. Memory (e.g., the at least one memory 301) stores program instructions and data to control the operations of the control apparatus 300. In the example of FIG. 3, the control apparatus 300 also includes protocol stack and a set of control functional modules and circuit. PDU session handling circuit handles PDU session establishment and modification procedures. Policy control module that configures policy rules for UE. Configuration and control circuit provides different parameters to configure and control UE of related functionalities including mobility management and session management. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines.

In some embodiments, the control apparatus 300 (i.e., the base station or the wireless transmitting and/or receiving point equipment) comprises the processor (e.g., the at least one data processing unit 302, 303) and the memory (e.g., the at least one memory 301). The memory includes computer program code causing the control apparatus 300 to perform processing according to the methods described further below with reference to FIG. 8.

Figure 4:
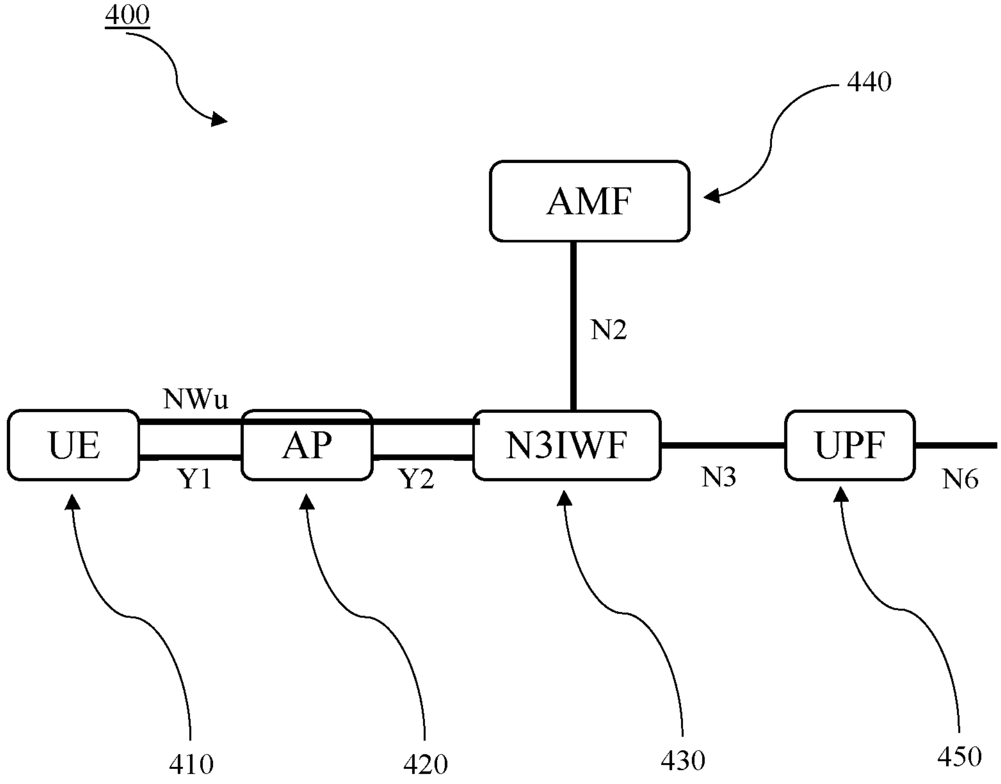
FIG. 4 shows a schematic diagram of another example communication system, with an access point, gateway functions and core network functions.

FIG. 4 shows a schematic diagram of an example communication system 400. The system comprises a terminal device (e.g., a user equipment) 410, which is in communication with an access point 420 via a first interface Y1. The access point 420 is in communication with a gateway function 430 (e.g., a Non-3GPP Inter-Working Function, N3IWF) via a second interface 2Y. The gateway function 430 is in communication with core network functions. In particular, it is in communication with an Access and Mobility Management Function (AMF), 440 via a third interface (N2). The gateway function 430 is furthermore in communication with a User Plane Function (UPF) 450. The gateway function 430 provides access for the terminal device 410 to the core network via access point 420.

The example of FIG. 4 shows a gateway function 430 in the form of a N3IWF, which provides non-trusted access. Other non-limiting examples of gateway functions include trusted non-3GPP gateway functions, TNGFs.

Figure 5:
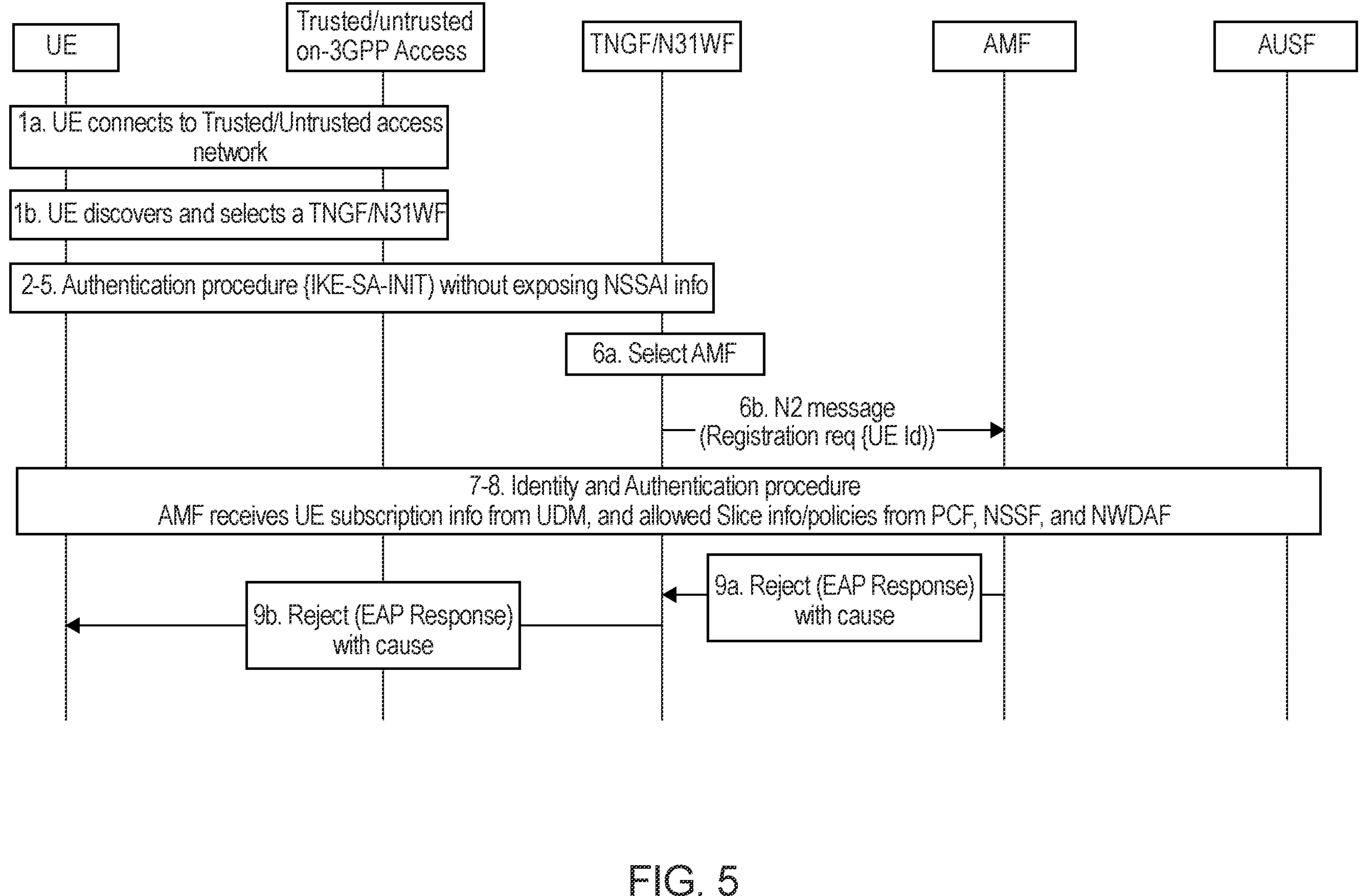
FIG. 5 shows a diagram of the communication flow between a terminal device and network devices, according to one embodiment.

FIG. 5 shows a diagram of the communication flow between a terminal device and network devices, according to one embodiment. In this example, communication of a user equipment UE is shown via a (trusted or non-trusted) non-3GPP access point and one candidate gateway function to core network functions, wherein a core network function determines whether access to the core network via the candidate gateway function is allowed or rejected. In the case of rejection, it indicates a cause of rejection.

In step 1a, the UE connects to the non-3GPP Access Point with an authentication procedure. It is typically assigned an IP address.

In step 1b, in order for the UE to attach to the 5GC network, the UE selects an N3IWF (in the case of non-trusted access) or a TNGF (in the case of trusted access) in a 5G Public Land Mobile Network (PLMN). details of the selection of an N3IFW are described in clause 6.3.6 of TS 23.501.

In steps 2-5, the UE proceeds with the establishment of an IPsec Security Association (SA) with the selected TNGF or N3IWF. Additionally, or alternatively, it initiates the IKE_AUTH authentication procedure (as per the defined specification of the selected TNGF and N3IWF).

In step 6, the TNGF or N3IWF selects an AMF based on the received access point parameters and local policy, as specified in clause 6.3.5 of 3GPP TS 23.501. The TNGF or N3IWF shall then forward the Registration Request received from the UE to the selected AMF within an N2 message.

In steps 7 and 8, the AMF may verify the identity and authentication of the UE with an Authentication Server Function, AUSF.

The core network function thus receives the request from the terminal device via the gateway function. In this case, the request comprises an authentication request.

In the example shown, the core network function (AMF) obtains gateway slicing information for that N3IWF, which is indicative of the slices supported by that N3IWF. The AMF further retrieves terminal slicing information, which is indicative of the slices required by the terminal device. Based on an overlap between the gateway slicing information and the terminal slicing information, the AMF may determine the subset of (requested) slices which is to be indicated as being supported (or as being rejected).

For instance, the AMF gets slicing subscription information from a Unified Data Management (UDM), and the allowed/rejected NSSAI from a Network Slice Selection Function (NSSF). Slicing information may be indicated by virtue of a Network Slicing Selection Assistance Information (NSSAI).

The AMF then determines that the TNGF or N3IWF selected by the UE does not support the slicing requirements. In step 9, the AMF rejects the registration of the UE. An Extensible Authentication Protocol (EAP) message within the Registration Reject conveys a cause for rejection (e.g., “Slice inappropriate/invalid TNGF selected” or “Slice inappropriate/invalid N3IWF selected”). The UE may then restart the discovery and selection of another TNGF or N3IWF. The request response comprises an authentication response.

In some embodiments, the AMF may convey information indicative of another suitable TNGF or N3IWF, which could satisfy the UE’s NSSAI needs, i.e., the terminal slicing information. The UE may then directly connect to the provided TNGF or N3IWF.

To summarize, the gateway function (TNGF or N3IWF) selects a core network function (AMF) to proceed with the UE registration to the 5GS. The AMF receives (from Network Slice Selection Function, NSSF) the allowed/rejected NSSAI for the UE. As it also knows the S-NSSAI(s) supported by the TNGF or N3IWF it can thus determine whether the initial TNGF or N3IWF selection by the UE was not appropriate in light of slicing requirements. The registration is rejected and the AMF may insert an indication (e.g., cause code) of the cause for rejection, indicating to the UE that the selected TNGF/N3IWF does not align with the terminal’s slicing requirements.

In addition to this information, the AMF may also propose one or more appropriate alternative TNGF(s)/N3IWF(s), which the UE could (seek to) connect to.

The UE may restart the TNGF/N3IWF discovery and selection procedure, or if the AMF proposed any TNGF(s)/N3IWF(s), the UE may directly select the TNGF/N3IWF provided by the AMF.

Figure 6:
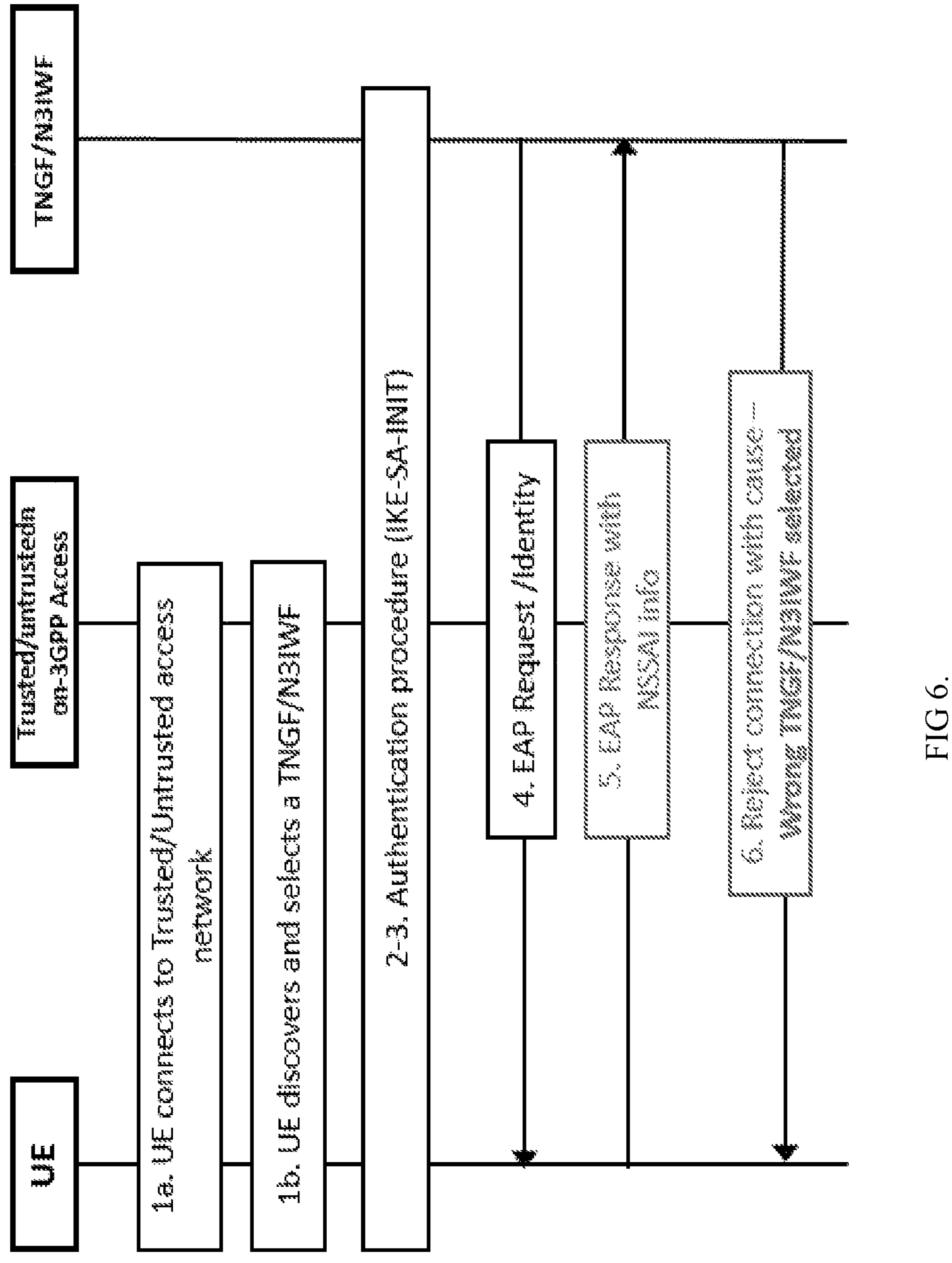
FIG. 6 shows a diagram of the communication flow between elements according to another embodiment.

FIG. 6 shows a diagram of the communication flow between elements according to another embodiment. In this example, communication of a user equipment UE is shown via a (trusted or non-trusted) non-3GPP access point to one candidate gateway function for accessing a core network, wherein the candidate gateway function determines whether access to the core network via the candidate gateway function is allowed or rejected. In the case of rejection, it indicates a cause of rejection.

In step 1a, the UE connects to a non-3GPP Access point with an authentication procedure. It is typically assigned an IP address.

In step 1b, in order for the UE to attach to 5GC network, the UE selects a candidate gateway function in a 5G PLMN, e.g. an N3IWF, as described in clause 6.3.6 of TS 23.501. Alternatively, for trusted access, it may select a TNGF.

In steps 2 and 3, the UE proceeds with the establishment of an IPsec Security Association (SA) with the selected N3IWF (or TNGF). In particular, it may initiate the IKE_AUTH authentication procedure (as per the defined specification for that TNGF or N3IWF).

In step 4, an EAP/Signalling request is sent from N3IWF (or TNGF) to the UE.

In step 5, the UE replies with an EAP Response to the TNGF/N3IWF. In the response, the UE may, depending on operator policies on NSSAI inclusion in AS (3GPP TS 23.501, section 5.15.9), send the requested NSSAI to the TNGF/N3IWF. Alternatively, the requested NSSAI may be provided via other L2 messages (secured transact).

In step 6, based on the requested NSSAI info (S-NSSAI(s) list), the TNGF/N3IWF may figure out that it cannot support any of the requested S-NSSAI(s) by the UE. Then, it simply “REJECTs” the UE’s request with a cause code indicating that the TNGF/N3IWF is not appropriate for the slices the UE wishes to use.

The UE then initiates another discovery and selection of another TNGF/N3IWF.

To summarize, this embodiment provides for a UE which (while selecting a TNGF/N3IWF) exposes the list of S-NSSAI(s) it would like to use. The TNGF/N3IWF can simply reject the UE request when the TNGF/N3IWF discovers that it does not support the requested S-NSSAI(s).

This reduces the signaling procedures and thus contributes to efficiency. The UE may reselect a TNGF/N3IWF even before initiating any AMF connection. The reselection might be triggered based on the requested and not the allowed NSSAI.

Figure 7:
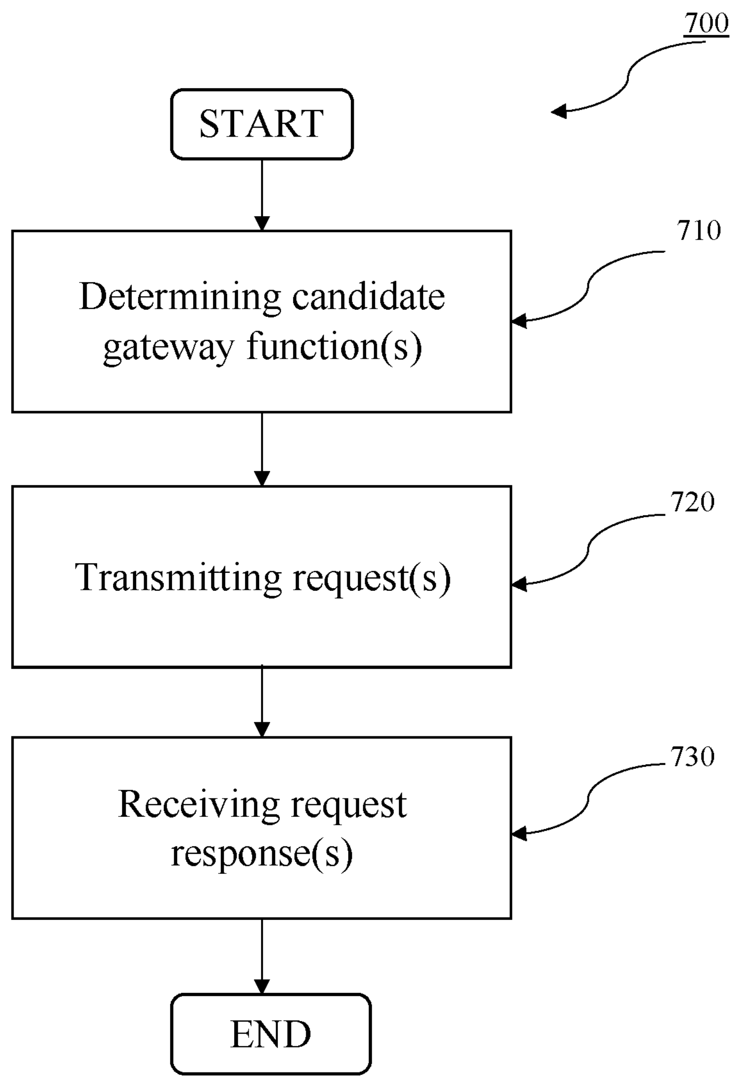
FIG. 7 shows a flow diagram of a method according to one aspect.

FIG. 7 shows a flow diagram of a method 700 according to one aspect. Method 700 is for operating a terminal device in a communications network having a core network and an access point. Examples of the network comprise a 3GPP core network, such as 5GC network. Examples of access points include a Non-3GPP access point. Examples of gateway functions comprise Trusted Non-3GPP access functions or Non-Trusted Non-3GPP access functions, such as a Trusted Non-3GPP Gateway Function (TNGF) or a Non-3GPP Interworking Function (N3IWF), respectively. Examples of core network functions comprises an Access and Mobility Management Function (AMF).

Method 700 comprises determining (at step 710) one or more candidate gateway functions for accessing the core network via the access point.

Method 700 further comprises transmitting (at step 720), to the one or more candidate gateway functions or to a core network function, a request for use of the one or more gateway functions to access the core network. The request may, for instance, indicate a set of one or more slices for use by the terminal device, which have been determined by the user device. Slices may be identified by a corresponding Single Network Slice Selection Assistance Information (S-NSSAI).

Method 700 further comprises receiving (at step 730), from the gateway function or from the core network function, a request response per candidate gateway function. The request response is configured to indicate whether the access to the core network via the respective gateway function is rejected and, in the case of rejection, to indicate a cause of rejection. For instance, the cause of rejection may comprise that the gateway function does not support one or more of the indicated slices. For instance, the request response may indicate a subset of slices of the determined set, access via the respective gateway function being rejected (or allowed) for the indicated subset.

The steps 720 and 730 may be repeated for each one of the candidate gateway functions. such repetitions may occur in parallel or sequentially to one another.

Figure 8:
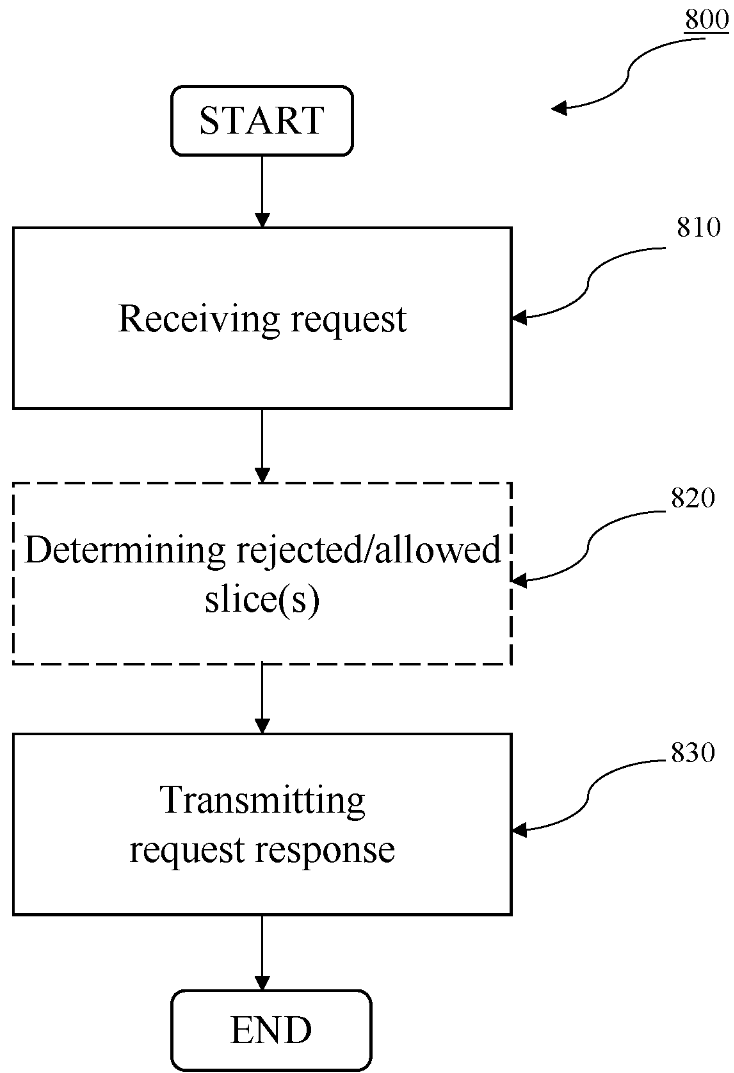
FIG. 8 shows a flow diagram of a method according to another aspect.

FIG. 8 shows a flow diagram of a method 800. Method 800 is for operating a network device in a communications network. The communications network comprises a core network and an access point.

As mentioned above, examples of the network comprise a 3GPP core network, such as 5GC network. Examples of access points include a Non-3GPP access point. Examples of gateway functions comprise Trusted Non-3GPP access functions or Non-Trusted Non-3GPP access functions, such as a Trusted Non-3GPP Gateway Function (TNGF) or a Non-3GPP Interworking Function (N3IWF), respectively. Examples of core network functions comprises an Access and Mobility Management Function (AMF).

Method 800 comprises receiving (at step 810) a request for use of a gateway function by a terminal device in accessing the core network via the access point. The request may, for instance, indicate a set of one or more slices for use by the terminal device, which have been determined by the user device. Slices may be identified by a corresponding Single Network Slice Selection Assistance Information (S-NSSAI).

In some examples, method 800 may comprise an optional step 820 (shown in dashed lines) of determining a subset of slices of the indicated set, for which access is rejected (or allowed). The determining of the subset comprises obtaining, for the requested gateway function, gateway slicing information as well as retrieving, from the received request, terminal slicing information based on the indicated set of one or more slices: Based on an overlap between the gateway slicing information and the terminal slicing information, the subset of slices is determined.

Method 800 further comprises transmitting (at step 830), to the terminal device, a request response configured to indicate whether access to the core network via the gateway function is rejected and, in the case of rejection, to indicate a cause of rejection. For instance, the cause of rejection may comprise that the gateway function does not support one or more of the indicated slices.

In cases where optional step 820 is performed, the request response may indicate a subset of slices of the determined set, access via the respective gateway function being rejected (or allowed) for the indicated subset.

Figure 9:
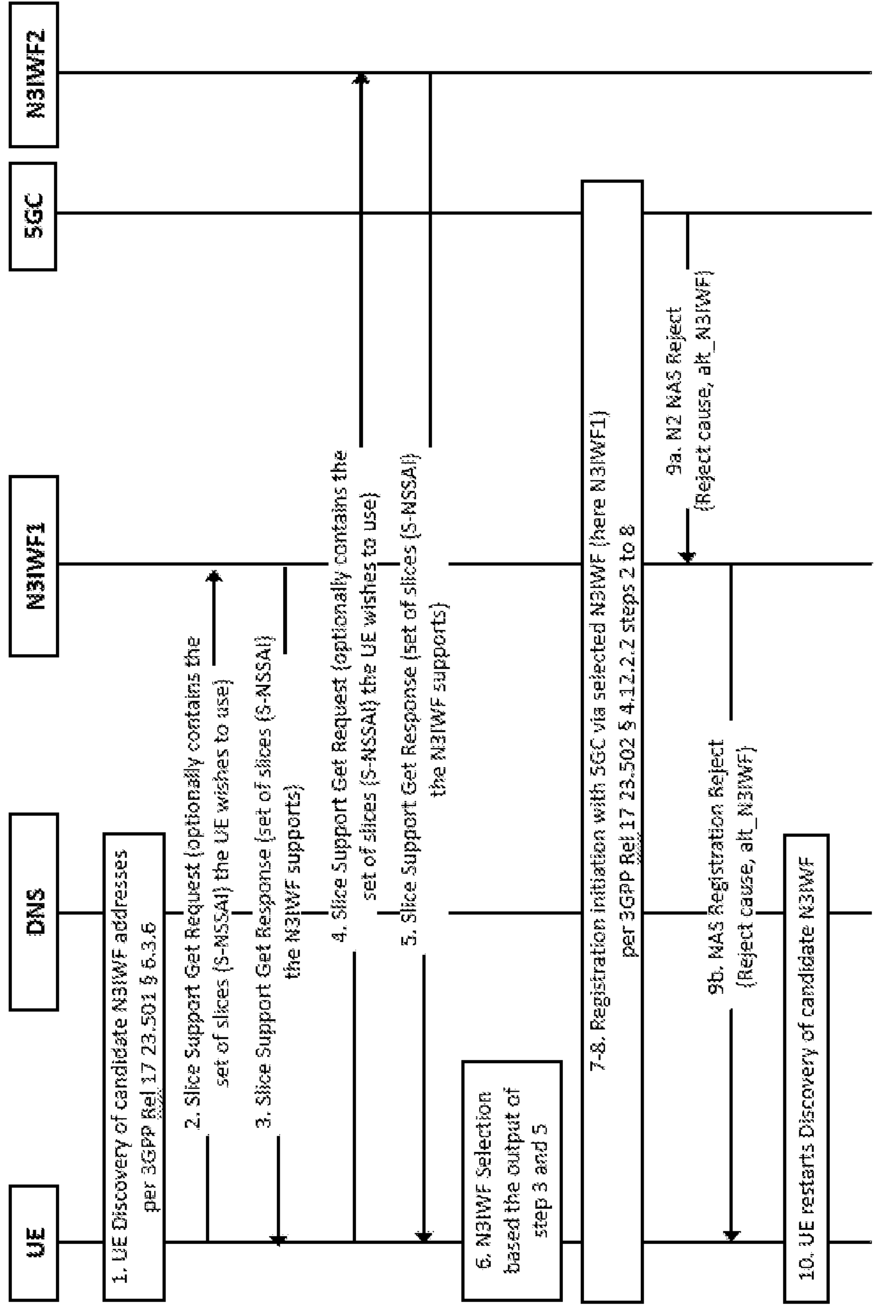
FIG. 9 shows a diagram of the communication flow between a terminal device and network devices, according to another embodiment.

FIG. 9 shows a diagram of the communication flow between a terminal device and network devices, according to another embodiment. In this example, multiple candidate gateway functions are contacted by the UE. A request is sent to the 5GC, which determines how to respond to the requests, including determination of cause for rejection.

The communication flow starts with Steps 1-6, which correspond to the steps 1-6 defined in clause 6.13.2.1 of 3GPP TR 23700-17:

At step 1, the UE performs discovery of candidate N3IWF according to clause 6.3.6 of 3GPP TS 23.501 (Rel-17), including PLMN selection (possibly taking into account the need to select a N3IWF in the local country) and including choice between N3IWF and EPDG and up to the point where the UE has received from DNS the IP addresses of candidate N3IWF; Using S-NAPTR DNS procedure the UE may discover which N3IWF supports the Slice Support Get request procedure, based on a dedicated S-NAPTR "Service Parameter" (equivalent to "x-3gpp-sgw:x-s5-gtp" defined in 3GPP TS 29.303).

At step 2, the UE sends a Slice Support Get request to a first candidate N3IWF. The Slice Support Get request may optionally contain the set of slices (S-NSSAI) the UE wishes to use (indicating to N3IWF that there is no need to answer with slices outside this set).

At step 3, the (first) N3IWF sends a Slice Support Get response that contains the set of slices (S-NSSAI) the N3IWF supports. This set of slices (S-NSSAI) is restricted to contain only a subset of the set of slices (S-NSSAI) the UE has indicated in the Slice Support Get request. It may also contain a caching information telling the UE how long the UE should consider this information valid for As steps 4 and 5, steps 2 and 3 are repeated for a second candidate N3IWF.

The Slice Support Get service may be designed as a (HTTPs) API exposed by the N3IWF to the UE and defined by 3GPP. Transport Layer Security (TLS) connections may be used between the UE and the N3IWF from step 2 to 5. The Slice Support Get service is not meant to change the state of the N3IWF (as the UE just gets information). The N3IWF is assumed to provide a server certificate as it does over IKE within R17 specifications.

At step 6, the UE selects, based on the information received from N3IWF in slice support get response, the N3IWF it will contact to access to the 5GC. In this case, the request comprises an authentication request and the UE transmits the authentication request to the core network function via the selected gateway function.

Hence, steps 1-6 correspond to the respective steps defined in clause 6.13.2.1 of 3GPP TR 23700-17:

At step 7, the UE connects to 5GC over the selected N3IWF, here the first candidate (N3IWF1), as per 3GPP 23.502 (Rel-17), clause 4.12.2.2 steps 2-7. It shall be noted that in this embodiment (having selected a suitable gateway function before registration initiation with the core network functions), the Internet Key Exchange Security Association Initialization (IKE_SA_Init) procedure, which requires heavy computation, is run only once, thereby decreasing computation requirements.

It shall be noted that it is possible to select a N3IWF also based on tracking area as the UE contacts N3IWF based on currently configured information.

At step 8, the AMF may verify the identity and authentication of the UE with AUSF. The AMF gets slicing subscription information from the UDM and the allowed/ rejected NSSAI from the NSSF. The AMF determines that the N3IWF selected by the UE does not support the slicing requirements.

At step 9, the AMF rejects the registration of the UE. The Registration Reject conveys a dedicated cause. Examples of such indications of the cause for rejection include "the N3IWF selected does not fit with the allowed NSSAI". Additionally, the AMF may optionally provide information on another suitable, alternative N3IWF (FQDN or IP address(es)) that could satisfy the UE's NSSAI needs. The indication of the alternative N3IWF is designated as "alt_N3IWF" in FIG. 9.

Hence, at step 9, the UE receives, from the core network function, a request response, which is in response to a request which has been transmitted to the core network function. The request response is configured to indicate whether the connection access to the core network via the respective gateway function is rejected and, in the case of rejection, to indicate a cause of rejection At step 10, the UE may restart the discovery and selection of another/alternative N3IWF based on the information received from the AMF.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems where enforcing fast connection re-establishment is required. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes exemplary embodiments, there are several variations and modifications which may be made to the disclosed solution without departing from the scope of the subject disclosure.

In general, the various exemplary embodiments may be implemented in hardware or special purpose circuits, software, logic or any combination thereof. Some aspects of the subject disclosure may be implemented in hardware, while other aspects may be implemented in firmware or software which may be executed by a controller, microprocessor or other computing device, although the subject disclosure is not limited thereto. While various aspects of the subject disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of the subject disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may comprise one or more of general-purpose computers, special purpose computers, microprocessors, digital signal processors (DSPs), application specific integrated circuits (ASICs), FPGA, gate level circuits and processors based on multi-core processor architecture, as non-limiting examples.

Example embodiments of the subject disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of the subject disclosure. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the subject disclosure as defined in the appended claims. Indeed, there is a further embodiment comprising a combination of one or more embodiments with any of the other embodiments previously discussed.

The invention claimed is:

1. A terminal device comprising:

at least one processor; and at least one memory storing computer program code, wherein the computer program code, when executed by the at least one processor, causes the terminal device to perform at least:

selecting a gateway function for accessing a core network of a communications system;

determining one or more network slices to request for the terminal device;

transmitting, to the gateway function, via a non 3$^{rd}$ Generation Partnership Program (non-3GPP) access point, a request for use of the gateway function to access the core network, the request comprising requested network slice assistance information (NSSAI) for the terminal device, the requested NSSAI including single network slice assistance information (S-NSSAI) for each respective network slice of the one or more network slices requested for the network slice; and after the transmitting, receiving, from the gateway function, via the non-3GPP access point, a response to the request, the response indicating that use of the gateway function to access to the core network is rejected, the response comprising information identifying one or more alternative gateway functions for the terminal device to use to access the core network, and an indication of a cause of rejection of the request, wherein the indication of the cause of rejection indicates that the gateway function does not support any of the one or more network slices requested for the terminal device.

2. The terminal device according to claim 1, wherein the gateway function comprises a Non-3GPP Interworking Function (N3IWF) or a Trusted Non-3GPP Gateway Function (TNGF).

3. A network device for a communications network, the network device comprising at least one processor; and at least one memory including computer program code of an access and mobility function of a core network of the communications network, wherein the computer program code, when executed by the at least one processor, causes the network device to perform at least:

receiving, from a terminal device, a request for use of a gateway function to access a core network of the communications networks via an access point of the communications network, the request comprising requested network slice assistance information (NSSAI) for the terminal device, the requested NSSAI including single network slice assistance information (S-NSSAI) for each respective requested network slice of the one or more requested network slices for the terminal device;

obtaining gateway slicing information for the gateway function, the gateway slicing information indicating one or more network slices supported by the gateway function;

retrieving terminal slicing information indicative of one or more allowed network slices for the terminal device based the requested NSSAI;

determining whether a network slice of the one or more network slices supported by the gateway function is one of the one or more allowed network slices for the terminal device;

in an instance the determining whether the network slice of the one or more network slices supported by the gateway function determines that the network slice is not one of the one or more allowed network slices for the terminal device:

identifying an alternative gateway function that supports at least one of the one or more allowed network slices for the terminal device; and transmitting a response to the request, the response indicating the request of the terminal device for use of the gateway function to access the core network is rejected, information that identifies the alternative gateway function that is identified, and an indication of a cause of rejection of the request, wherein the indication of the cause of rejection indicates that the gateway function does not support any allowed network slice of the one or more network allowed network slices for the terminal device.

4. The network device according to claim 3, wherein the gateway function comprises a Non-3GPP Interworking Function (N3IWF) or a Trusted Non-3GPP Gateway Function (TNGF).

5. The network device according to claim 3, wherein each respective network slice of the one or more network slices supported by the gateway function is identified by a corresponding Single Network Slice Selection Assistance Information (S-NSSAI).

6. The network device according to claim 3, wherein the request comprises a registration request and the response comprises a registration response, or the request comprises an authentication request and the response comprises an authentication response.

7. A network device for a communications network, the network device comprising:

at least one processor; and at least one memory including computer program code of a gateway function of the communications network, wherein the computer program code, when executed by the at least one processor, causes the network device to perform at least:

receiving, from a terminal device via a non-3rd Generation Partnership Program (non-3GPP) access point, a request for use of the gateway function to access a core network of the communications network, the request comprising requested network slice assistance information (NSSAI) for the terminal device, the requested NSSAI including single network slice assistance information (S-NSSAI) for each respective network slice of one or more network slices requested by the terminal device; and determining whether the gateway function supports any of the one or more network slices requested by the terminal device;

in an instance the determining determines that the gateway function does not support any of the one or more network slices requested by the terminal device, transmitting a response to the request, the response indicating rejection of the request of the terminal device for use of the gateway function to access the core network, the response comprising an indication of a cause of rejection of the request, wherein the indication of the cause of rejection indicates that the gateway function does not support any of the one or more network slices requested by the terminal device.

* * * * *